United States Patent

Bernardini

[11] Patent Number: 5,481,939
[45] Date of Patent: Jan. 9, 1996

[54] CABLE STRAIN RELIEF DEVICE

[75] Inventor: Allen J. Bernardini, Southbury, Conn.

[73] Assignee: Litton Systems, Inc., Watertown, Conn.

[21] Appl. No.: 174,356

[22] Filed: Dec. 28, 1993

[51] Int. Cl.$^6$ .............................. H02G 15/02; H01R 3/02
[52] U.S. Cl. ........................................... 74/502.4; 439/589
[58] Field of Search ............................... 74/502.4, 502.6; 439/589, 598, 460, 456, 457, 458

[56] References Cited

U.S. PATENT DOCUMENTS

| | | | |
|---|---|---|---|
| 2,031,564 | 9/1933 | Knutson | 173/332 |
| 2,134,350 | 6/1937 | Woolley | 247/25 |
| 3,196,222 | 7/1965 | Maëlstaf | 439/456 |
| 3,889,046 | 6/1975 | Oberdiear | 174/78 |

Primary Examiner—Rodney H. Bonck
Assistant Examiner—David Fenstermacher
Attorney, Agent, or Firm—Michael H. Wallach

[57] ABSTRACT

A cable strain relief device is described comprised of a pair of disks each having an opening therein sized to allow a cable to be passed therethrough; and an arrangement to maintain the disks in a position relative to one another such that the openings are proximate and offset whereby cable passed through the openings is kinked and retained therebetween. The disks may be identical, the opening in each disk being offset from the disk center. The disks are positioned relative to one another to offset the openings therein. The preferred arrangement to maintain the disks in position relative to one another is a backshell and backnut assembly. The cable strain relief device, when used with a plurality of electrically conductive sheathed cables, provides, where electrically conductive disks are used, an electrically conductive pathway between the plurality of cables to ground.

1 Claim, 4 Drawing Sheets

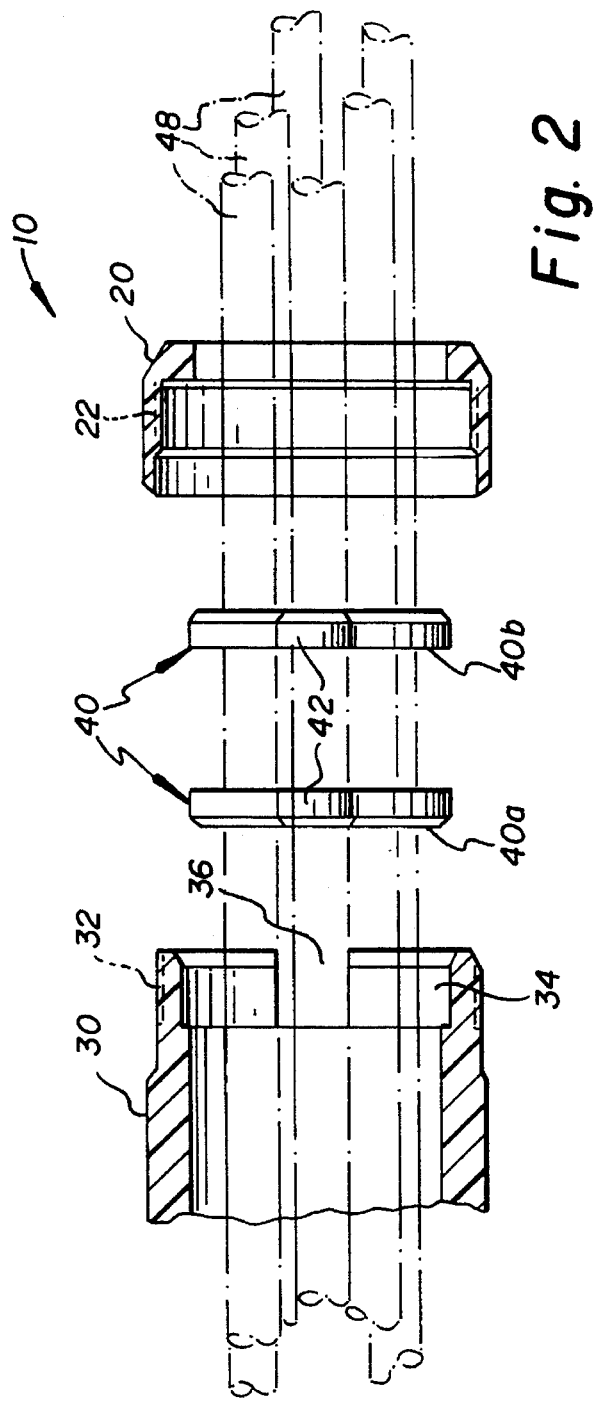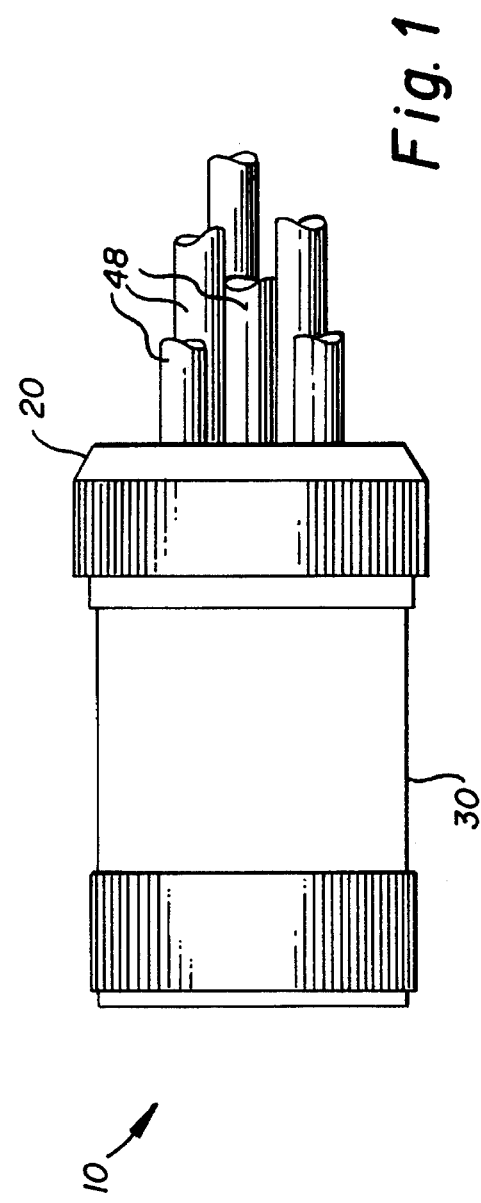

CABLE STRAIN RELIEF DEVICE

TECHNICAL FIELD

The invention relates generally to cable strain relief devices.

BACKGROUND ART

Strain relief devices are known in the prior art. The strain relief device of the present device provides an elegant solution, with disks having offset openings oriented and retained in a backshell and backnut assembly to form a simple and effective strain relief device.

SUMMARY OF THE INVENTION

The present invention relates to cable strain relief devices comprising a pair of disks each having an opening therein sized to allow a cable to be passed therethrough and means to maintain such disks in a position relative to one another such that the openings are proximate and offset whereby cable passed through said openings is kinked and retained thereatween. It is possible to use more than two disks, although, not necessary, whereby a plurality of kinks in series are formed.

Identical disks may be used in which the opening in each disk is offset from the disk center. The disks are positioned relative to one another to offset the openings therein whereby when the disks are brought close to one another, the offset causes the cable to kink between the proximal opposing disk faces.

The preferred means to maintain the disk in position relative to one another is a backshell and backnut assembly. The disks may have one or a plurality of openings therein, sized to allow cables to be passed therethrough.

In one embodiment of the invention, the disks have tabs and the backshell has recesses. The tabs of said disks are inserted within the recesses to maintain the disks in position relative to one another.

In an alternative embodiment of the invention, disks have recesses and said backshell has ridges which fit within the recesses to maintain the disks in position relative to one another.

A particularly preferred disk architecture is one having a plurality of openings. One of the openings is offset from the central longitudinal axis of the disk. Such central opening is surrounded (encircled) by other openings. The encircling openings are positioned relative to the central opening, such that a circle having a radius originating at the center of the center opening and circumscribing the center opening passes through the center of the other encircling openings.

The strain relief mechanism of the present invention may be used for gripping a single cable or a multiplicity of cables. The term "cable" as used herein refers to conduits, wires, and a variety of cables which may vary in architecture, which include specifically, electric cables, that may be polymer and/or metal fabric or mesh sheathed.

The invention, where electric cable is used, involves the use of a non-conductive disk with a single hole or multiplicity of holes (sized for the cable) which are offset slightly from lines of symmetry such that when two identical disks are used when one is reversed with respect to the other, there is an offset of the matching holes. When a cable is passed through these holes with the disks spread apart, the cable passes easily. When the disks are pressed together, the offset causes a slight kink in the cable which prevents the cable from being pulled out.

The material selected for the disk is not a part of the present invention. The disk can suitably be made of metal, but for both safety and economy, plastic is the material of choice.

The cables, wires, conduits and the like may have resilient outer surfaces or be encased in a rigid sheath, such as a metal fabric sheath. For the latter, a metal disk is utilized.

Use of electrically conductive disks, particularly where a plurality of cables are engaged in the manner of the present invention, provides a good ohmic connection to ground. Accordingly, an important embodiment of the present invention relates to the use of conductive disks, most suitably metal, to provide a terminus for shielded cables through the body of the connector to ground. Most preferably, the cable(s) are metal sheathed and the metal braid forms a metal to metal conductive path with one or the other or both disks. At least one of the disks is electrically conductive, preferably metal and connected to ground. The engagement of disks to cable, which provides kink formation, functions to provide a secure electrically conductive path.

The strain relief disks as herein noted are preferably housed in an assembly comprising a backshell and a backnut. In this regard, although various disk positioning means such as tabs and notches are preferred, the disks may be positioned by compressing same to form the requisite cable kink simply by using screws passed through the disks, or by using clamps or the like.

The disk can be of any geometry; and, when the means of maintaining disks in oriented position comprises a backshell, the disk may be round, with or without tabs, elliptical, triangular, polygonal, suitably with the perimeter of the disk interfitting within the interior of the backshell. The exterior of the backshell needs to be of architecture appropriate to the backnut for engagement and application of torque to bring the disks into proximity to one another to kink the cable; the most facile, though not only engagement method, being a thread engagement system typically used in backshell and backnut assemblies.

Referring again to orientation of openings to achieve required offset, the options are numerous. Where disks with tabs are used, there can be multiple recesses in the backshell and/or different tab locations on the disks. Where recesses in the disks are used, recess engaging ridges within the backshell can be offset from the longitudinal access of the backshell.

BRIEF DESCRIPTION OF THE DRAWINGS

FIG. 1 is a side elevational view of the cable strain relief device of the present invention.

FIG. 2 is an exploded sectional view of the cable strain relief device of FIG. 1 with the cables shown in phantom.

FIG. 3b is a rear plan view of the disk shown in 3a.

DETAILED DESCRIPTION OF THE DRAWINGS

Figure 3A:
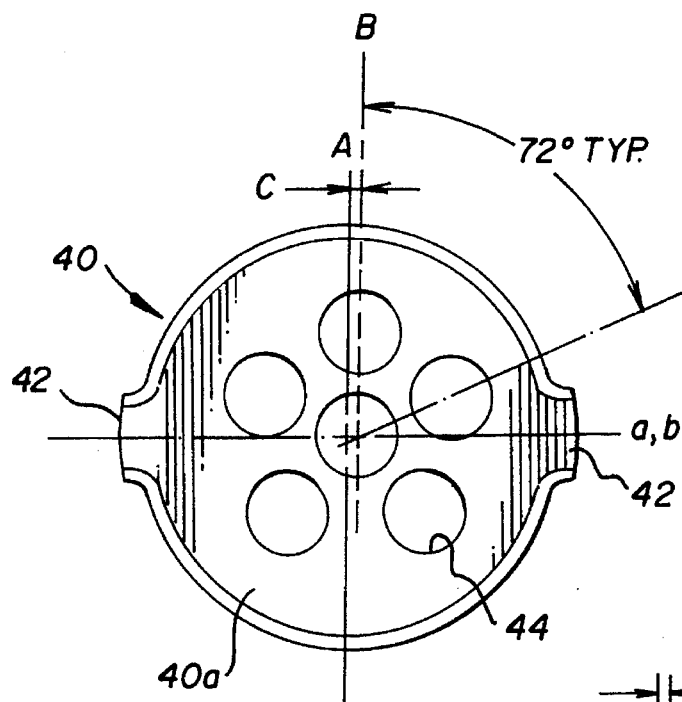
FIG. 3a is a front plan view of a disk of the present invention.

In FIG. 1, the cable strain relief device 10 is shown with backnut 20 engaged with backshell 30. In FIG. 2, inside threads 22 of backnut 20 are shown, which mate with the threaded portion 32 of backshell 30. Also shown is notch 36 in backshell 30 which accepts tab 42 of disks 40 to align same. The opening 34 in backshell 30 houses disks 40. In FIG. 2, the cable is shown in phantom prior to disk orientation.

FIG. 3a illustrates the front face 40a of disk 40. The disk center is shown at the intersection of A-a and the center of the central offset opening 44 is shown at B-b. The offset is shown at C.

Figure 3B:
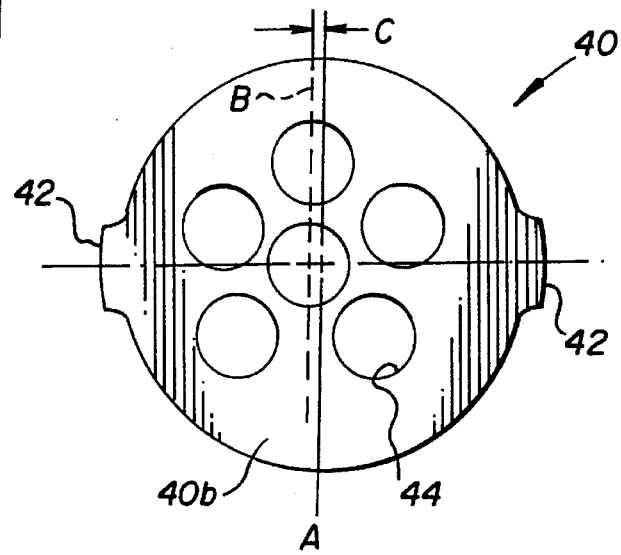

FIG. 3b illustrates the rear face 40b of disk 40.

Figure 4:
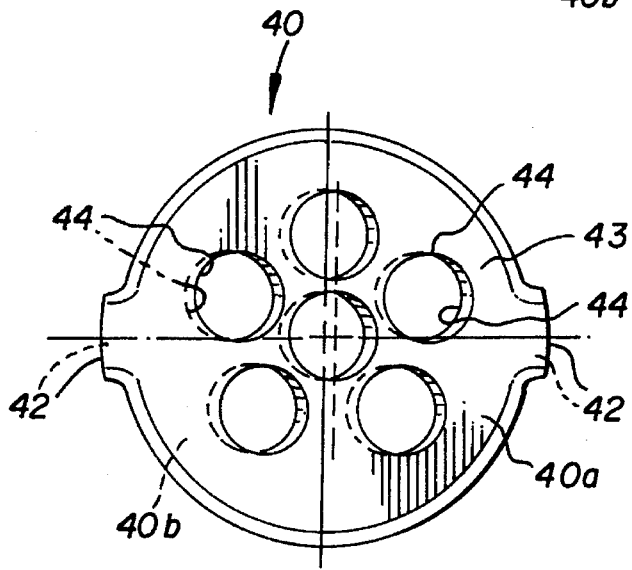
FIG. 4 is a front view of paired disks illustrating overlap of the openings.

In FIG. 4, an array of two disks are arranged with rear faces 40(b) proximate showing the offset at 43. Such offset, as shown in FIGS. 7 and 8, when the disks are proximally oriented, causes kink 49 in cables 48.

Figure 5:
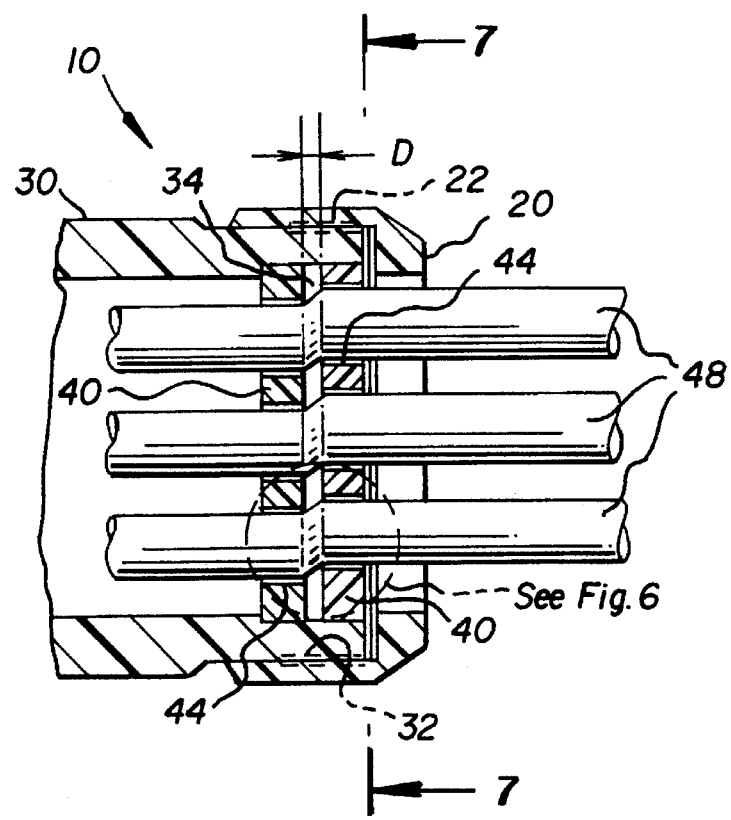
FIG. 5 is a partial sectional view of the present invention in use.
Figure 6:
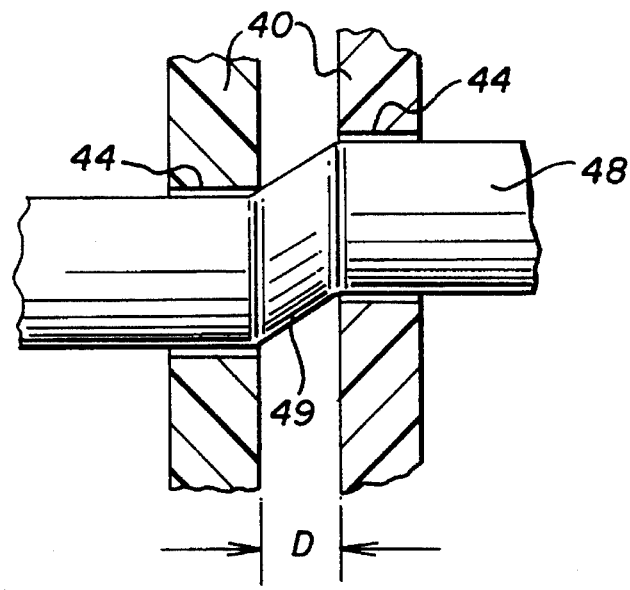
FIG. 6 is a partial view taken from FIG. 5.

In FIGS. 5 and 6, the invention in use is shown wherein cables 48, as best shown in FIG. 6, are secured by kink 49 within separation D between disks 40 which prevents movement of the cable.

Figure 7:
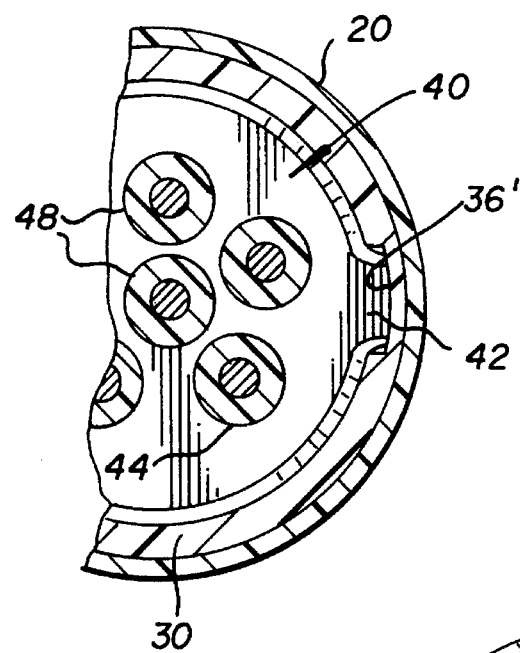
FIG. 7 is a sectional view taken from 7—7 of FIG. 5.

In FIG. 7, a partial cross-section of FIG. 5, taken along 7—7, is shown. Referring to FIG. 7, the engaged backshell and backnut assembly is shown with the disk in oriented position and tab 42 within notch 36' which prevents rotational movement. In the embodiment shown in FIG. 7, notch 36' does not extend through the housing of backshell 30.

Figure 8:
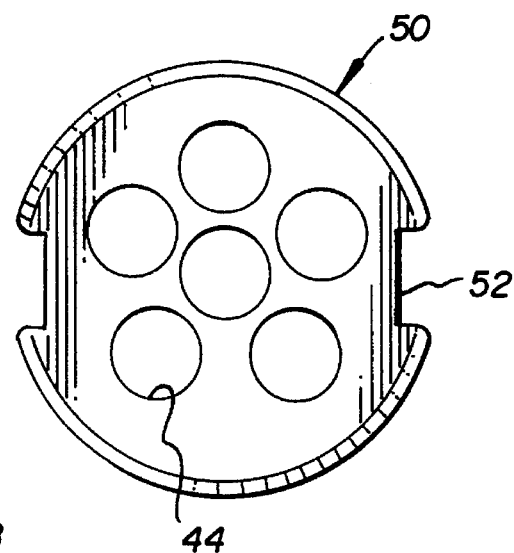
FIG. 8 is a front elevational view of a notched disk.
Figure 9:
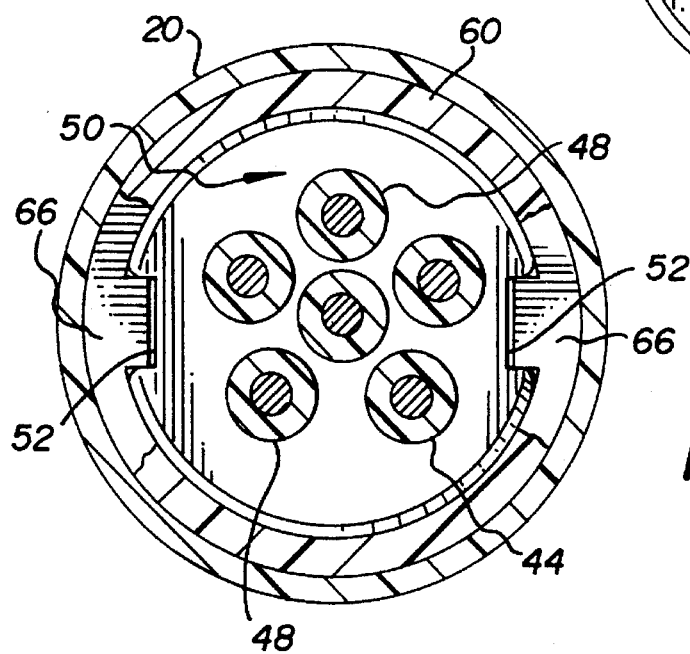
FIG. 9 is a sectional view illustrating the embodiment of the invention where the disk is notched.

FIGS. 8 and 9 illustrate the embodiment of the invention, where the notch and tab arrangement of FIG. 7 is reversed so that the notch 52 is in the disk 50 and tab 66 extends from the interior of the backshell 60.

Assembly of the strain relief disks provides mechanical restraint needed for the individual cables engaged and kinked as the disks are oriented to provide offset of openings and brought toward one another to kink the cable. Assembly may be achieved by sliding the backnut rearward over a bundle of cables following by one of two disks, with side 40a side facing towards the backnut. The cables are passed through the disk openings. The second disk is slipped over the individual cables, with side 40a facing the backshell. The tabs/ears on the second disk align with those of the first disk. Finally, the backshell is slid over the cables.

After terminating the cables to an electrical connector (not shown), the backshell is slipped forward. The first disk is positioned with its ears in slots provided in the rear of the backshell. The second disk is slid forward and its ears positioned at the lead in of the slots. The backnut is brought forward and tightened down onto the backshell. This compresses the disks together causing the individual cables to deform in the resultant offset. After applying adequate torque, the connector is ready for use. The torque required varies based on the type of cable used and is readily determined for each application empirically.

Although assembly is described by reference to a strain relief assembly for an electrical connector, the strain relief devices of the present invention, as will be appreciated, find broad application in strain relief of a broad variety of cables individually or in plural arrays and used in other applications.

While the best mode for carrying out the invention has been described in detail, those familiar with the art to which this invention relates will recognize various alternative designs and embodiments for practicing the invention as defined by the following claims.

I claim:

1. A cable strain relief device comprising:
   a) a pair of disks, each of said disks having a plurality of openings therein sized to allow cables to be passed therethrough, wherein the plurality of openings on each disk is comprised of a first opening offset from the central longitudinal axis of the disk, and other openings positioned away from and around said first opening, such that a circle centered on and circumscribing the first opening passes through the center of the other openings and
   b) means to maintain said disks in a position relative to one another such that the openings are proximate and offset whereby cable passed through said openings is kinked and retained therebetween.

\* \* \* \* \*